US009982091B2

(12) United States Patent
Hintzer et al.

(10) Patent No.: US 9,982,091 B2
(45) Date of Patent: May 29, 2018

(54) HIGHLY FLUORINATED ELASTOMERS

(71) Applicant: 3M INNOVATIVE PROPERTIES COMPANY, St. Paul, MN (US)

(72) Inventors: Klaus Hintzer, Kastl (DE); Florian D. Jochum, Neuotting (DE); Harald Kaspar, Burgkirchen (DE); Kai H. Lochhaas, Neuotting (DE); Tilman C. Zipplies, Burghausen (DE); Tatsuo Fukushi, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days. days.

(21) Appl. No.: 15/122,538

(22) PCT Filed: Mar. 3, 2015

(86) PCT No.: PCT/US2015/018402
§ 371 (c)(1),
(2) Date: Aug. 30, 2016

(87) PCT Pub. No.: WO2015/134435
PCT Pub. Date: Sep. 11, 2015

(65) Prior Publication Data
US 2017/0066877 A1 Mar. 9, 2017

Related U.S. Application Data

(60) Provisional application No. 61/949,204, filed on Mar. 6, 2014.

(51) Int. Cl.
*C08G 65/00* (2006.01)
*C08L 23/28* (2006.01)
*C08L 15/02* (2006.01)

(52) U.S. Cl.
CPC ............ *C08G 65/007* (2013.01); *C08L 23/28* (2013.01)

(58) Field of Classification Search
CPC .................................................... C08G 65/00
USPC ......................................................... 528/392
See application file for complete search history.

(56) References Cited

U.S. PATENT DOCUMENTS

| 3,467,638 | A | 9/1969 | Baryton |
| 3,505,411 | A | 4/1970 | Rice |
| 3,682,872 | A | 8/1972 | Brizzolara |
| 3,900,380 | A | 8/1975 | Anderson |
| 4,035,565 | A | 7/1977 | Apotheker |
| 4,243,770 | A | 1/1981 | Tatemoto |
| 4,281,092 | A | 7/1981 | Breazeale |
| 4,897,451 | A | 1/1990 | Nakagawa |
| 4,910,276 | A | 3/1990 | Nakamura |
| 4,972,038 | A | 11/1990 | Logothetis |
| 5,264,508 | A | 11/1993 | Ishibe |
| 5,313,003 | A | 5/1994 | Kruger |
| 5,393,852 | A | 2/1995 | Ishibe |
| 5,399,645 | A | 3/1995 | Kruger |
| 5,449,825 | A | 9/1995 | Ishibe |
| 5,585,449 | A | 12/1996 | Arcella |
| 5,612,419 | A | 3/1997 | Arcella |
| 5,717,036 | A | 2/1998 | Saito |
| 6,114,452 | A | 9/2000 | Schmiegel |
| 6,160,051 | A | 12/2000 | Tatsu et al. |
| 6,380,337 | B2 | 4/2002 | Abe |
| 6,429,258 | B1 | 8/2002 | Morgan |
| 6,573,410 | B2 | 6/2003 | Wlassics |
| 6,624,328 | B1 | 9/2003 | Guerra |
| 6,646,077 | B1 | 11/2003 | Lyons |
| 6,960,381 | B2 | 11/2005 | Matsukura |
| 7,375,157 | B2 | 5/2008 | Amos |
| 7,388,054 | B2 | 6/2008 | Adair |
| 7,408,006 | B2 | 8/2008 | Comino |
| 7,528,184 | B2 | 5/2009 | Funaki |
| 7,671,112 | B2 | 3/2010 | Hintzer |
| 8,168,714 | B2 | 5/2012 | Stanga |

(Continued)

FOREIGN PATENT DOCUMENTS

| CN | 1485692 | 3/2004 |
| CN | 101331189 | 12/2008 |

(Continued)

OTHER PUBLICATIONS

Arcella, "New Peroxide Curable Perfluoroelastomer for High Temperature Applications," American Chemical Society, 1998, Paper No. 16, pp. 1-22.
Boyer, "Iodine Transfer Polymerization (ITP) of Vinylidene Fluoride (VDF).Influence of the Defect of VDF Chaining on the Control of ITP", Macromolecules, 2005, vol. 38, pp. 10353-10362.
Comino, "New Peroxide Curable Perfluoroelastomer for High Temperature Applications", Progress in Rubber and Plastics Technology, 2001, vol. 17, No. 2, pp. 101-111.
Oka, "Vinylidene Fluoride—Hexafluoropropylene Copolymer having Terminal Iodines", Polymer Sciences, 1984, pp. 763-777.
Shroff, "Assessment of NMR and Rheology for the Characterization of LCB in Essentially Linear Polyethylenes", Macromolecules, 2001, vol. 34, No. 21, pp. 7362-7367.

(Continued)

Primary Examiner — Duc Truong
(74) Attorney, Agent, or Firm — Julie Lapos-Kuchar

(57) ABSTRACT

Described herein is a peroxide curable, highly fluorinated elastomer derived from (a) a fluorinated di-iodo ether compound of the following formula I: $R_f$—CF(I)—$(CX_2)_n$—$(CX_2CXR)_m$—O—R"f-$O_k$—$(CXR'CX_2)_p$—$(CX_2)_q$—CF(I)—$R'_f$ wherein X is independently selected from F, H, and Cl; $R_f$ and $R'_f$ are independently selected from F and a monovalent perfluoroalkane having 1-3 carbons; R is F, or a partially fluorinated or perfluorinated alkane comprising 1-3 carbons; $R''_f$ is a divalent fluoroalkylene having 1-5 carbons or a divalent fluorinated alkylene ether having 1-8 carbons and at least one ether linkage; k is 0 or 1; and n, m, and p are independently selected from an integer from 0-5, with the proviso that when k is 0, n+m is at least 1 and p+q is at least 1; and (b) a fluorinated monomer.

16 Claims, No Drawings

(56) References Cited

U.S. PATENT DOCUMENTS

| | | |
|---|---|---|
| 8,604,137 B2 | 12/2013 | Grootaert |
| 8,835,551 B2 | 9/2014 | Fukushi |
| 8,912,283 B2 | 12/2014 | Hayashi et al. |
| 9,260,553 B2 | 2/2016 | Hintzer |
| 2001/0008922 A1 | 7/2001 | Abe |
| 2007/0015937 A1 | 1/2007 | Hintzer |
| 2007/0072973 A1 | 3/2007 | Funaki |
| 2007/0208137 A1 | 9/2007 | Kasper |
| 2008/0125558 A1 | 5/2008 | Tang |
| 2010/0069558 A1 | 3/2010 | Stanga |
| 2012/0067706 A1 | 3/2012 | Terada |
| 2012/0073696 A1 | 3/2012 | Terada |

FOREIGN PATENT DOCUMENTS

| | | |
|---|---|---|
| CN | 103180380 | 6/2013 |
| EP | 1548038 | 6/2005 |
| EP | 1978380 | 10/2008 |
| EP | 2264100 | 12/2010 |
| EP | 2383302 | 11/2011 |
| EP | 2396353 | 12/2011 |
| EP | 2568007 | 3/2013 |
| JP | 63-238115 | 10/1984 |
| JP | 08-157539 | 6/1996 |
| JP | 2002-303982 | 10/2002 |
| JP | 2005-350490 | 12/2005 |
| JP | 2008-23852 | 2/2008 |
| JP | 2008-031195 | 2/2008 |
| JP | 2008-303321 | 12/2008 |
| JP | 2010-0144127 | 7/2010 |
| WO | WO 2008-140914 | 11/2008 |
| WO | WO 2010-076876 | 7/2010 |
| WO | WO 2012-049093 | 4/2012 |
| WO | WO 2012-073977 | 6/2012 |
| WO | WO 2012-168351 | 12/2012 |
| WO | WO 2014-088804 | 6/2014 |
| WO | WO 2015-134435 | 9/2015 |

OTHER PUBLICATIONS

Shroff, "Long-Chain-Branching Index for Essentially Linear Polyethylenes", Macromolecules, 1999, vol. 32, No. 25, pp. 8454-8464.

Smith, "The Mechanism of Post Cure of Viton A Fluorocarbon Elastomer", Journal of Applied Polymer Science, 1961, vol. V, No. 16, pp. 460-467.

Sugiyama,"Perfluoropolymers Obtained by Cyclopolymerization and Their Applications", Modern Fluoropolymers, 541-555 (1997).

International Search report for PCT international Application No. PCT/US2015/018402 dated May 22, 2015, 4 pages.

Zhao, et al., "A comprehensive handbook of synthetic rubber technology," $2^{nd}$ Edition, Sep. 30, 2006, p. 1096 (in Chinese).

HIGHLY FLUORINATED ELASTOMERS

CROSS REFERENCE TO RELATED APPLICATIONS

This application is a national stage filing under 35 U.S.C. 371 of PCT/US2015/018402, filed Mar. 3, 2015, which claims the benefit of U.S. Application No. 61/949,204, filed Mar. 6, 2014, the disclosure of which is incorporated by reference in its/their entirety herein.

TECHNICAL FIELD

A highly fluorinated elastomer composition is described.

BACKGROUND

Perfluoroelastomers (elastomeric perfluoropolymers) exhibit outstanding high temperature tolerance and chemical resistance in both the cured and uncured states. These properties are attributable to the stability and inertness of the copolymerized perfluorinated monomer units which form the major portion of the polymer backbone, e.g. tetrafluoroethylene, perfluoro(methyl vinyl)ether, perfluoro(propyl vinyl)ether and others disclosed in U.S. Pat. Nos. 3,467,638; 3,682,872; 4,035,565; 4,281,092; and 4,972,038. Perfluoroelastomers also, however, necessarily contain small quantities of less stable copolymerized cure site monomers and, in addition, many perfluoroelastomers contain reactive endgroups introduced by the use of chain transfer agents or molecular weight regulators during polymerization. Such moieties must have a high degree of reactivity in order to promote effective crosslinking and cure chemistry, but this reactivity inherently renders the polymers more susceptible to degradative chemical reactions, such as oxidation. Consequently, certain physical properties of the polymer, in particular compression set, and high temperature stress/strain properties, are adversely affected.

SUMMARY

There is a desire to identify alternate methods of making fluoropolymers, which are easier and/or are lower cost to manufacture while providing sufficient iodine introduction into the fluoropolymer. There is a desire to identify alternate methods of making fluoropolymers, which provide unique characteristics to the resulting fluoropolymer.

In one aspect, a composition is provided comprising a highly fluorinated elastomer gum wherein the highly fluorinated elastomer gum is derived from (a) a fluorinated di-iodo ether compound of the following formula I:

$$R_f-CF(I)-(CX_2)_n-(CX_2CXR)_m-O-R''_f-O_k-(CXR'CX_2)_p-(CX_2)_q-CF(I)-R'_f$$

wherein

X is independently selected from F, H, and Cl;
R is F, or a partially fluorinated or perfluorinated alkane comprising 1-3 carbons;
$R_f$ and $R'_f$ are independently selected from F and a monovalent perfluoroalkane having 1-3 carbons;
$R''_f$ is a divalent fluoroalkylene having 1-5 carbons or a divalent fluorinated alkylene ether having 1-8 carbons and at least one ether linkage;
k is 0 or 1; and n, m, q, and p are independently selected from an integer from 0-5, with the proviso that when k is 0, n plus m are at least 1 and p plus q are at least 1; and (b) a fluorinated monomer.

In another aspect, there is provided a composition comprising a highly fluorinated elastomer gum wherein the polymer backbone of the highly fluorinated elastomer gum comprises at least one segment of the following formula II:

$$-CF(R_f)-(CX_2)_n-(CX_2CXR)_m-O-R''_f-O_k-(CXR'CX_2)_p-(CX_2)_q-CF(R'_f)-$$

wherein

X is independently selected from F, H, and Cl;
$R_f$ and $R'_f$ are independently selected from F and a monovalent perfluoroalkane having 1-3 carbons;
R is F, or a partially fluorinated or perfluorinated alkane comprising 1-3 carbons;
$R''_f$ is a divalent fluoroalkylene having 1-5 carbons or a divalent fluorinated alkylene ether having 1-8 carbons and at least one ether linkage;
k is 0 or 1; and n, m, q, and p are independently selected from an integer from 0-5, with the proviso that when k is 0, n plus m are at least 1 and p plus q are at least 1.

In yet another aspect there is provided a method of polymerizing a highly fluorinated polymer comprising:

(a) providing
(i) a fluorinated di-iodo ether compound of the following formula I:

$$R_f-CF(I)-(CX_2)_n-(CX_2CXR)_m-O-R''_f-O_k-(CXR'CX_2)_p-(CX_2)_q-CF(I)-R'_f$$

wherein

X is independently selected from F, H, and Cl;
$R_f$ and $R'_f$ are independently selected from F and a monovalent perfluoroalkane having 1-3 carbons;
R is F, or a partially fluorinated or perfluorinated alkane comprising 1-3 carbons;
R"f is a divalent fluoroalkylene having 1-5 carbons or a divalent fluorinated alkylene ether having 1-8 carbons and at least one ether linkage;
k is 0 or 1; and n, m, q, and p are independently selected from an integer from 0-5, with the proviso that when k is 0, n plus m are at least 1 and p plus q are at least 1; and (ii) a fluorinated monomer; and
(b) contacting the fluorinated di-iodo ether compound and the fluorinated monomer with an initiator in the presence of water.

The above summary is not intended to describe each embodiment. The details of one or more embodiments of the invention are also set forth in the description below. Other features, objects, and advantages will be apparent from the description and from the claims.

DETAILED DESCRIPTION

As used herein, the term

"a", "an", and "the" are used interchangeably and mean one or more; and

"and/or" is used to indicate one or both stated cases may occur, for example A and/or B includes, (A and B) and (A or B);

"backbone" refers to the main continuous chain of the polymer;

"crosslinking" refers to connecting two pre-formed polymer chains using chemical bonds or chemical groups;

"cure site" refers to functional groups, which may participate in crosslinking;

"monomer" is a molecule which can undergo polymerization which then forms part of the essential structure of a polymer; and "polymer" refers to a macrostructure having a number average molecular weight (Mn) of at least 50,000 dalton, at least 100,000 dalton, at least 300,000 dalton, at least 500,000 dalton, at least, 750,000 dalton, at least 1,000,000 dalton, or even at least 1,500,000 dalton and not such a high molecular weight as to cause premature gelling of the polymer.

Also herein, recitation of ranges by endpoints includes all numbers subsumed within that range (e.g., 1 to 10 includes 1.4, 1.9, 2.33, 5.75, 9.98, etc.).

Also herein, recitation of "at least one" includes all numbers of one and greater (e.g., at least 2, at least 4, at least 6, at least 8, at least 10, at least 25, at least 50, at least 100, etc.).

The present application is directed towards the polymerization of fluoropolymers, specifically towards highly fluorinated elastomer gum.

Fluoroelastomers are heat stable and resistant to a wide range of chemical reagents. For this reason fluoroelastomers are typically used for making O-rings, gaskets, oil seals, diaphragms, hoses, tubings, rolls and sheeting materials, in particular in the automotive industry and chemical industry.

Fluoroelastomers are typically obtained by curing (cross-linking) a generally amorphous fluoropolymer. To achieve sufficient cross-linking, the amorphous fluoropolymers contain cure sites, which are reactive groups that can undergo cross-linking reactions in the presence of suitable cross-linking agents.

A commonly used cure system is based on a peroxide cure reaction using appropriate curing compounds having or creating peroxides, which in turn are believed to generate free radicals. The fluoroelastomers suitable for use in peroxide curing systems (peroxide curable fluoroelastomers) contain reactive sites which include halogens, such as bromine and/or iodine. It is generally believed that the bromine or iodine atoms are abstracted in the free radical peroxide cure reaction, thereby causing the fluoropolymer molecules to cross-link and to form a three dimensional network.

Terminal iodine groups may be introduced into the polymer during the polymerization using, for example, organic chain transfer agents (such as $CF_2I_2$ or $ICF_2CF_2CF_2CF_2I$), and/or fluorinated cure site monomers, both of which tend to introduce a sufficient amount of iodine into the fluoropolymer. However, these fluorinated compounds are sometimes expensive. Furthermore, because they are typically not very water soluble, when doing an aqueous polymerization, certain steps may be taken to improve their incorporation. For example, co-solvents, fluorinated emulsifiers, and/or preemulsions of the fluorinated chain transfer agents and/or fluorinated cure site monomers may be used during the polymerization to assist with the solubility issues of the fluorinated chain transfer agents and/or fluorinated cure site monomers. In another example, the fluorinated chain transfer agents and/or fluorinated cure site monomers may be sprayed as small droplets into the reaction vessel to more quickly solubilize the fluorinated chain transfer agents and/or fluorinated cure site monomers in the water. This poses a disadvantage in manufacturing because solvents have to be removed and recycled which increases the cost of the polymerization and the emulsifiers are desirably removed from the resulting fluoropolymer, which leads to increased process steps and costs as well.

In the present disclosure, it has discovered that by using a fluorinated di-iodo ether compound during polymerization of fluorinated monomers, the above-mentioned issues can be solved, namely the fluorinated di-iodo ether compound has a higher solubility in water, compared to materials having the same number of carbons but no oxygen, eliminating or reducing the need for organic solvents and/or fluorinated emulsifiers, while enabling a sufficient amount of iodine to be incorporated into the fluoropolymer. Additionally, although not wanting to be limited by theory, because these fluorinated di-iodo ether compounds can be polymerized by both ends and comprise an ether linkage, these compounds may enable flexibility in the polymer backbone, which could impact $T_g$ (glass transition temperature) and/or prevent crystallization during elongation of the polymer.

Fluorinated di-iodo ether compound

The fluorinated di-iodo ether compound of the present disclosure has a structure according to Formula I:

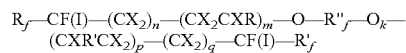

$R_f$—CF(I)—$(CX_2)_n$—$(CX_2CXR)_m$—O—$R''_f$—$O_k$—$(CXR'CX_2)_p$—$(CX_2)_q$—CF(I)—$R'_f$ wherein
X is independently selected from F, H, and Cl;
$R_f$ and $R'_f$ are independently selected from F and a monovalent perfluoroalkane having 1-3 carbons;
R is F, or a partially fluorinated or perfluorinated alkane comprising 1-3 carbons;
$R''_f$ is a divalent fluoroalkylene having 1-5 carbons or a divalent fluorinated alkylene ether having 1-8 carbons and at least one ether linkage;
k is 0 or 1; and n, m, q, and p are independently selected from an integer from 0-5, with the proviso that when k is 0, n+m is at least 1 and p+q is at least 1.

In one embodiment $R_f$ and/or $R'_f$ is F. In another embodiment $R_f$ and/or $R'_f$ are independently a perfluorinated alkane, which can be linear or branched comprising 1 to 3 carbon atoms. Exemplary segments include: —$CF_3$, and —$CF_2CF_3$, In one embodiment R is F. In another embodiment R is a partially fluorinated or perfluorinated alkane, which can be linear or branched comprising 1 to 3 carbon atoms. Exemplary R segments include: —$CF_3$, —$CF_2CF_3$, and —$CF_2$—$CF_2H$ In one embodiment $R''_f$ is a divalent linear or branched fluoroalkylene having 1-5 carbons. In another embodiment, $R''_f$ is a divalent linear or branched fluorinated alkylene ether having 1 to 8 carbon atoms and at least one internal (i.e., not at an end) ether linkage, (in other words, in Formula I there are not two oxygen atoms next to each other, e.g., —O—O—). Exemplary $R''_f$ segments include: —$CF_2$—; —$CF_2$—$CF_2$—; —$CF_2$—$CF_2$—$CF_2$—; —$(CF_2)_n$— wherein n is an integer from 1-5; —CFH—; —CFH—$CF_2$—; —$CH_2$—$CF_2$—; —$CF_2$—CF($CF_3$)—; —$CH_2$—$CF_2$—$CF_2$—$CF_2$—; —$CF_2$—CHF—$CF_2$—; —$CF_2$—$CH_2$—$CF_2$—; —$CF_2$—$(OCF_2)_n$— wherein n is an integer from 0-5; —$CF_2$—$(OCF_2)_n$—$OCF_2$— wherein n is an integer from 0-5; —$CF_2$—(O—$[CF_2]_n)_z$— wherein n is an integer from 0-5, and z is an integer from 1-4; —$CF_2$—(O—$[CF_2]_n$)—$CF_2$— where n is 0-5; —$(CF_2$—$CF)_n$— wherein n is an integer from 0-3; —$CX_1.X_2$—(O—$[CFX_3])_n$—$CX_4.X_5$— wherein n is 0-5 and $X_1$, $X_2$, $X_3$, $X_4$, and $X_5$ are independently selected from H, F, or Cl; —$(CF_2)_n$—$(OCF_2$—CF($CF_3$))$_p$—O—$(CF_2)_z$ wherein n is an integer from 1-5, p is an integer from 0-5 and z is an integer from 1-5; and —($CF_2$—CF($CF_3$)—O)$_m$—O—$(CF_2)_n$—O—$(CF_2$—CF($CF_3$)O)$_p$—$(CF_2)_z$— where m is an integer from 1-3, n is an integer from 1-5, p is an integer from 0-3, and z is an integer from 1-5.

In fluoropolymer polymerizations, it is desirable that the fluorinated di-iodo ether compound is either perfluorinated (comprising C—F bonds and no C—H bonds) or highly fluorinated, comprising less than 1%, 0.5% or even 0.25% by weight of hydrogen.

Exemplary fluorinated di-iodo ether compounds include:
I—CF$_2$—CF$_2$—O—CF$_2$—CF$_2$—I;  I—CF$_2$—CF$_2$—O—(CF$_2$)$_b$—I wherein b is an integer from 3-10;
I—(CF$_2$)$_c$—O—(CF$_2$)$_b$—I wherein c is an integer from 3-10 and b is an integer from 3-10;
ICF$_2$—CF$_2$—O—CF$_2$—O—CF$_2$—CF$_2$—I;
ICF$_2$—CF$_2$—O—CF$_2$—(CF$_2$)$_b$—O—CF$_2$—CF$_2$I wherein b is an integer from 1-5;
ICF$_2$—CF$_2$[O—CF$_2$—(CF$_2$)$_b$]$_z$—O—CF$_2$—CF$_2$I wherein b is an integer from 1-5, z is an integer from 1-4;
I—CF$_2$—CH$_2$—O—CF$_2$—CF$_2$—CF$_2$I;  I—CF$_2$—CH$_2$—CF$_2$—O—CF$_2$—CF$_2$—CF$_2$I;
I—CF$_2$—CHF—CF$_2$—O—CF$_2$—CF$_2$—CF$_2$I;  ICF$_2$—CF$_2$—O—CF$_2$—CFI—CF$_3$
ICF$_2$—CF$_2$—(CF$_2$)$_a$—[O—CF—CF$_2$]$_b$—(O—[CF$_2$]$_c$)$_z$—O[—CF$_2$]$_d$—CF$_2$—CF$_2$I wherein a is an integer from 0-6, b is an integer from 0-5, c, is an integer from 1-6, d is an integer from 0-6 and z is an integer from 0-6;
ICF$_2$—(CF$_2$)$_a$—(O—CF$_2$CF(CF$_3$))$_b$—O—(CF$_2$)$_c$—O—(CF$_2$—CF—O)$_d$—(CF$_2$)$_z$—O—CF$_2$CF$_2$—I wherein a is an integer from 0-6, b is an integer from 0-5, c, is an integer from 1-6, d is an integer from 0-5 and z is an integer from 0-5; and I—CF$_2$—(CF$_2$)$_a$—O—(CF$_2$)$_b$—O—CF$_2$—CF(CF$_3$)—I wherein a is an integer from 1-5 and b is an integer from 1-5.

Such materials can be bought e.g. from Anles (St. Petersburg-Russia) or prepared by known synthesis, e.g. by addition of IF to bis-olefines or for example by reacting iodine containing acid fluorides with alkylfluoro-sulfate followed by IF-addition. Another method would be the reaction of sulfinates with iodine salts.

The above-mentioned Diiodo-compounds can be added/used as individual compounds or as mixtures of different Diiodo-compounds.

Polymerization

In the present disclosure, monomers are polymerized in the presence of the fluorinated di-iodo ether compound to form a highly fluorinated elastomer gum. In the present disclosure, the monomer is at least one of a fluorinated monomer, however, additional monomers, such as non-fluorinated monomers or cure site monomers may also be added.

A fluorinated monomer is a monomer having a carbon-carbon double bond and comprising at least one fluorine atom. The fluorinated monomer may be perfluorinated (or fully fluorinated) or partially fluorinated (comprising at least one carbon-hydrogen bond and at least one carbon-fluorine bond).

Exemplary perfluorinated monomers include: perhalogenated alkenes such as hexafluoropropene (HFP), tetrafluoroethylene (TFE), and trifluorochloroethylene (CTFE), and a perfluorinated oxyalkenes such as a perfluorovinyl ether monomer, a perfluoroallyl ether monomer, or include a combination of a perfluorovinyl ether monomer and a perfluoroallyl ether monomer. Exemplary perfluoro ether monomers may have the following formula:

$$CF_2=CF(CF_2)_bO(R_{f'}O)_n(R_fO)_mR_f$$

where $R_{f'}$ and $R_f$ are independently linear or branched perfluoroalkylene radical groups comprising 2, 3, 4, 5, or 6 carbon atoms, m and n are independently an integer selected from 0, 1, 2, 3, 4, 5, 6, 7, 8, 9, and 10, and $R_f$ is a perfluoroalkyl group comprising 1, 2, 3, 4, 5, or 6 carbon atoms; wherein b is 0 or 1; n is 0 or 1; and m is 0, 1, 2, 3, 4, or 5.

Examplary perfluorovinyl ether monomers include: perfluoro (methyl vinyl) ether (PMVE), perfluoro (ethyl vinyl) ether (PEVE), perfluoro (n-propyl vinyl) ether (PPVE-1), perfluoro-2-propoxypropylvinyl ether (PPVE-2), perfluoro-3-methoxy-n-propylvinyl ether, perfluoro-2-methoxy-ethylvinyl ether, perfluoro-methoxy-methylvinylether (CF$_3$—O—CF$_2$—O—CF═CF$_2$), and CF$_3$—(CF$_2$)$_2$—O—CF (CF$_3$)—CF$_2$—O—CF(CF$_3$)—CF$_2$—O—CF═CF$_2$, perfluoro (methyl allyl) ether (CF$_2$═CF—CF$_2$—O—CF$_3$), perfluoro (ethyl allyl) ether, perfluoro (n-propyl allyl) ether, perfluoro-2-propoxypropyl allyl ether, perfluoro-3-methoxy-n-propylallyl ether, perfluoro-2-methoxy-ethyl allyl ether, perfluoro-methoxy-methyl allyl ether, and CF$_3$—(CF$_2$)$_2$—O—CF(CF$_3$)—CF$_2$—O—CF(CF$_3$)—CF$_2$—O—CF$_2$CF═CF$_2$, and combinations thereof.

Exemplary partially fluorinated monomers include: vinyl fluoride (VF), vinylidene fluoride (VDF), pentafluoropropylene (e.g., 2-hydropentafluropropylene), trifluoroethylene, and combinations thereof.

In one embodiment, the highly fluorinated elastomer gum of the present disclosure is further derived from a fluorinated bisolefin compound represented by the following formula:

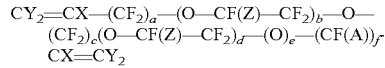

wherein a is an integer selected from 0, 1, and 2; b is an integer selected from 0, 1, and 2; c is an integer selected from 0, 1, 2, 3, 4, 5, 6, 7, and 8; d is an integer selected from 0, 1, and 2; e is 0 or 1; f is an integer selected from 0, 1, 2, 3, 4, 5, and 6; Z is independently selected from F and CF$_3$; A is F or a perfluorinated alkyl group; X is independently H or F; and Y is independently selected from H, F, and CF$_3$. In a preferred embodiment, the highly fluorinated bisolefin compound is perfluorinated, meaning that X and Y are independently selected from F and CF$_3$.

Exemplary compounds of the fluorinated bisolefin compound include:  CF$_2$═CF—O—(CF$_2$)$_2$—O—CF═CF$_2$, CF$_2$═CF—O—(CF$_2$)$_3$—O—CF═CF$_2$,  CF$_2$═CF—O—(CF$_2$)$_4$—O—CF═CF$_2$,  CF$_2$═CF—O—(CF$_2$)$_5$—O—CF═CF$_2$,  CF$_2$═CF—O—(CF$_2$)$_6$—O—CF═CF$_2$, CF$_2$═CF—CF$_2$—O—(CF$_2$)$_2$—O—CF═CF$_2$, CF$_2$═CF—CF$_2$—O—(CF$_2$)$_3$—O—CF═CF$_2$, CF$_2$═CF—CF$_2$—O—(CF$_2$)$_4$—O—CF═CF$_2$, CF$_2$═CF—CF$_2$—O—(CF$_2$)$_4$—O—CF═CF$_2$, CF$_2$═CF—CF$_2$—O—(CF$_2$)$_5$—O—CF═CF$_2$, CF$_2$═CF—CF$_2$—O—(CF$_2$)$_6$—O—CF═CF$_2$, CF$_2$═CF—CF$_2$—O—(CF$_2$)$_2$—O—CF$_2$—CF═CF$_2$, CF$_2$═CF—CF$_2$—O—(CF$_2$)$_3$—O—CF$_2$—CF═CF$_2$, CF$_2$═CF—CF$_2$—O—(CF$_2$)$_4$—O—CF$_2$—CF═CF$_2$, CF$_2$═CF—CF$_2$—O—(CF$_2$)$_5$—O—CF$_2$—CF═CF$_2$, CF$_2$═CF—CF$_2$—O—(CF$_2$)$_6$—O—CF$_2$—CF═CF$_2$, CF$_2$═CF—O—CF$_2$CF$_2$—CH═CH$_2$,  CF$_2$═CF—(OCF(CF$_3$)CF$_2$)—O—CF$_2$CF$_2$—CH═CH$_2$,  CF$_2$═CF—(OCF(CF$_3$)CF$_2$)$_2$—O—CF$_2$CF$_2$—CH═CH$_2$, CF$_2$═CF CF$_2$—O—CF$_2$CF$_2$—CH═CH$_2$,  CF$_2$═CF CF$_2$—(OCF(CF$_3$)CF$_2$)—O—CF$_2$CF$_2$—CH═CH$_2$,  CF$_2$═CFCF$_2$—(OCF(CF$_3$)CF$_2$)$_2$—O—CF$_2$CF$_2$—CH═CH$_2$, CF$_2$═CF—CF$_2$—CH═CH$_2$,  CF$_2$═CF—O—(CF$_2$)$_c$—O—CF$_2$—CF$_2$—CH═CH$_2$ wherein c is an integer selected from 2 to 6, CF$_2$═CFCF$_2$—O—(CF$_2$)$_c$—O—CF$_2$—CF$_2$—CH═CH$_2$ wherein c is an integer selected from 2 to 6, CF$_2$═CF—(OCF(CF$_3$)CF$_2$)$_b$—O—CF(CF$_3$)—CH═CH$_2$ wherein b is 0, 1, or 2, CF$_2$═CF—CF$_2$—(OCF(CF$_3$)CF$_2$)$_b$—O—CF(CF$_3$)—CH═CH$_2$ wherein b is 0, 1, or 2, CH$_2$═CH—

$(CF_2)_n$—O—CH=CH$_2$ wherein n is an integer from 1-10, and CF$_2$=CF—(CF$_2$)$_a$—(O—CF(CF$_3$)CF$_2$)$_b$—O—(CF$_2$)$_c$—(OCF(CF$_3$)CF$_2$)$_f$—O—CF=CF$_2$ wherein a is 0 or 1, b is 0, 1, or 2, c is 1, 2, 3, 4, 5, or 6, and f is 0, 1, or 2.

In one embodiment, preferred compounds of the fluorinated bisolefin compound include: CF$_2$=CF—O—(CF$_2$)$_n$—O—CF=CF$_2$ where n is an integer from 2-6; CF$_2$=CF—(CF$_2$)$_a$—O—(CF$_2$)$_n$—O—(CF$_2$)$_b$—CF=CF$_2$ where n is an integer from 2-6 and a and b are 0 or 1; and perfluorinated compounds comprising a perfluorinated vinyl ether and a perfluorinated allyl ether.

In the present disclosure, 0.01 mol % to 1 mol % of a compound of the fluorinated bisolefin compound based on total moles of monomer incorporated may be used. In some embodiments, at least 0.02, 0.05, or even 0.1 mol % of the fluorinated bisolefin compound is used and at most 0.5, 0.75, or even 0.9 mol % of a compound of the fluorinated bisolefin compound is used based on the total moles of monomer incorporated into the highly fluorinated polymer.

The highly fluorinated polymers of the present disclosure may comprise at least one, at least two, or even at least three different fluorinated monomers.

In addition to the fluorinated monomer, non-fluorinated monomers may be added. Exemplary non-fluorinated monomers include: propylene, ethylene, isobutylene, and combinations thereof. Generally, these additional monomers would be used at less than 40, 30, 25, 20, 10, 5, or even 3 mole percent of the highly fluorinated polymer.

In one embodiment, a combination of fluorinated monomers is used, wherein the monomers are selected from: TFE and propylene; TFE, propylene, and VDF; VDF and HFP; TFE, VDF, and HFP; TFE and perfluoroethyl vinyl ether; TFE and perfluorinated butyl vinyl ether; TFE, perfluoroethyl vinyl ether, and perfluorinated butyl vinyl ether; and VDF and CF$_2$=CFOC$_3$F$_7$; ethylene and HFP; CTFE and VDF; TFE and VDF; TFE, VDF, PMVE, and ethylene; TFE and ethylene; TFE, ethylene, and HFP; TFE, ethylene, and PPVE; TFE, ethylene, HFP, and PPVE; and TFE, VDF, and CF$_2$=CFO(CF$_2$)$_3$OCF$_3$.

In one embodiment, cure site monomers, may be used in the polymerization. Such cure site monomers include those monomers capable of free radical polymerization. In one embodiment, the cure site monomer comprises an iodine capable of participating in a peroxide cure reaction, where, for example, the iodine atom capable of participating in the peroxide cure reaction is located at a terminal position of the backbone chain. Additionally, the cure site monomer can be perfluorinated to ensure adequate thermal stability of the resulting elastomer.

In one embodiment of the present disclosure, a fluorinated iodine containing cure site monomer may be used as represented by the following formula:

CY$_2$—CX—(CF$_2$)$_g$—(O—CF(CF$_3$)—CF$_2$)$_h$—O—(CF$_2$)$_i$—(O)$_j$—(CF$_2$)$_k$—CF(I)—X (III)

wherein X and Y are independently selected from H, F, and CF$_3$; g is 0 or 1; h is an integer selected from 0, 2, and 3; i is an integer selected from 0, 1, 2, 3, 4, and 5; j is 0 or 1; and k is an integer selected from 0, 1, 2, 3, 4, 5, and 6. In one in embodiment, the fluorinated iodine containing cure site monomer is perfluorinated.

Exemplary compounds of Formula (III) include: CF$_2$=CFOC$_4$F$_8$I (MV4I), CF$_2$=CFOC$_2$F$_4$I, CF$_2$=CFOCF$_2$CF(CF$_3$)OC$_2$F$_4$I, CF$_2$=CF—(OCF$_2$CF(CF$_3$))$_2$—O—C$_2$F$_4$I, CF$_2$=CF—O—CF$_2$CFI—CF$_3$, CF$_2$=CF—O—CF$_2$CF(CF$_3$)—O—CF$_2$CFI—CF$_3$, CF$_2$=CF—O—(CF$_2$)$_2$—O—C$_2$F$_4$I, CF$_2$=CF—O—(CF$_2$)$_3$—O—C$_2$F$_4$I, CF$_2$=CF—O—(CF$_2$)$_4$—O—C$_2$F$_4$I, CF$_2$=CF—O—(CF$_2$)$_5$—O—C$_2$F$_4$I, CF$_2$=CF—O—(CF$_2$)$_6$—O—C$_2$F$_4$I, CF$_2$=CF—CF$_2$—O—CF$_2$—O—C$_2$F$_4$I, CF$_2$=CF—CF$_2$—O—(CF$_2$)$_2$—O—C$_2$F$_4$I, CF$_2$=CF—CF$_2$—O—C$_2$F$_4$I, CF$_2$=O—(CF$_2$)$_3$—O—C$_2$F$_4$I, CF$_2$=CF—CF$_2$—O—(CF$_2$)$_4$—O—C$_2$F$_4$I, CF$_2$=CF—CF$_2$—O—(CF$_2$)$_5$—O—C$_2$F$_4$I, CF$_2$=CF—CF$_2$—O—(CF$_2$)$_6$—O—C$_2$F$_4$I, CF$_2$=CF—CF$_2$—O—C$_2$F$_4$I, CF$_2$=CF—CF$_2$—O—CF$_2$CF(CF$_3$)—O—C$_2$F$_4$I, CF$_4$I, CF$_2$=CF—CF$_2$—(OCF$_2$CF(CF$_3$))$_2$—O—C$_2$F$_4$I, CF$_2$=CF—CF$_2$—O—CF$_2$CFI—CF$_3$, CF$_2$=CF—CF$_2$—O—CF$_2$CF(CF$_3$)—O—CF$_2$CFI—CF$_3$, and combinations thereof. In one embodiment, preferred compounds of Formula (III) include: CF$_2$=CFOC$_4$F$_8$I; CF$_2$=CFCF$_2$OC$_4$F$_8$I; CF$_2$=CFOC$_2$F$_4$I; CF$_2$=CFCF$_2$OC$_2$F$_4$I, CF$_2$=CF—O—(CF$_2$)$_n$—O—CF$_2$—CF$_2$I and CF$_2$=CFCF$_2$—O—(CF$_2$)$_n$—O—CF$_2$—CF$_2$I wherein n is an integer selected from 2, 3, 4, or 6; and combinations thereof.

In one embodiment, 0.01 mol % to 1 mol % of a compound of Formula (III) based on total moles of monomer incorporated may be used. In some embodiments, at least 0.02, 0.05, or even 0.1 mol % of a compound Formula (III) is used and at most 0.5, 0.75, or even 0.9 mol % of a compound of Formula (III) is used based on the total moles of monomer incorporated into the fluoropolymer.

In another embodiment, cure site monomers can include for example (a) bromo- or iodo-(per)fluoroalkyl-(per)fluorovinylethers having the formula:

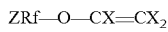

ZRf—O—CX=CX$_2$ wherein each X may be the same or different and represents H or F, Z is Br or I, Rf is a (per)fluoroalkylene C1-C12, optionally containing chlorine and/or ether oxygen atoms. Suitable examples include ZCF$_2$—O—CF=CF$_2$, ZCF$_2$CF$_2$—O—CF=CF$_2$, ZCF$_2$CF$_2$CF$_2$—O—CF=CF$_2$, CF3CFZCF$_2$—O—CF=CF$_2$, wherein Z represents Br of I; and (b) bromo- or iodo (per)fluoroolefins such as those having the formula:

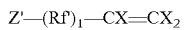

Z'—(Rf)$_r$—CX=CX$_2$ wherein each X independently represents H or F, Z' is Br or I, Rf' is a perfluoroalkylene C1-C12, optionally containing chlorine atoms and r is 0 or 1 (Examples include: bromo- or iodo-trifluoroethene, 4-bromo-perfluorobutene-1, 4-iodo-perfluorobutene-1, or bromo- or iodo-fluoroolefins such as 1-iodo,2,2-difluroroethene, 1-bromo-2,2-difluoroethene, 4-iodo-3,3,4,4,-tetrafluorobutene-1 and 4-bromo-3,3,4,4-tetrafluorobutene-1; and (c) non-fluorinated bromo and iodo-olefins such as vinyl bromide, vinyl iodide, 4-bromo-1-butene and 4-iodo-1-butene. Typically these cure-site monomers, if used, are used in amounts of at least 0.01, 0.02, 0.05, or even 0.1 mol % and at most 0.5, 0.75, 0.9, or even 1 mol % based on the total moles of monomer incorporated into the fluoropolymer.

In addition to the cure site monomers described above, the highly fluorinated elastomers of the present disclosure may further contain other cure-sites which may be reactive to peroxide cure systems or which may be reactive to other cure systems for example, but not limited to bisphenol curing systems or triazine curing systems. In the latter case the highly fluorinated elastomer would be curable by a dual cure system or a multi cure system.

Examples of such additional cure sites include nitriles, for example nitriles introduced into the polymer from nitrile containing monomers. Examples of nitrile containing monomers that may be used correspond to the following formulas: $CF_2=CF-CF_2-O-Rf-CN$; $CF_2=CFO(CF_2)_rCN$; $CF_2=CFO[CF_2CF(CF_3)O]_p(CF_2)_vOCF(CF_3)CN$; $CF_2=CF[OCF_2CF(CF_3)]_kO(CF_2)_uCN$ wherein, r represents an integer of 2 to 12; p represents an integer of 0 to 4; k represents 1 or 2; v represents an integer of 0 to 6; u represents an integer of 1 to 6, Rf is a perfluoroalkylene or a bivalent perfluoroether group. Specific examples of nitrile containing fluorinated monomers include perfluoro (8-cyano-5-methyl-3,6-dioxa-1-octene), $CF_2=CFO(CF_2)_5CN$, and $CF_2=CFO(CF_2)_3OCF(CF_3)CN$.

Known aqueous polymerization techniques including emulsion polymerization (wherein that polymerization occurs in polymer particles dispersed in water which may be electrostatically stabilized) may be used.

The reactor vessel for use in the polymerization process of the present disclosure is typically a pressurizable vessel capable of withstanding the internal pressures during the polymerization reaction. Typically, the reaction vessel will include a mechanical agitator, which will produce thorough mixing of the reactor contents and heat exchange system. Any quantity of the fluorinated monomer(s) and additional monomers may be charged to the reactor vessel. The monomers may be charged batch-wise or in a continuous or semi-continuous manner. By semi-continuous is meant that a plurality of batches of the monomer are charged to the vessel during the course of the polymerization. The independent rate at which the monomers are added to the kettle will depend on the consumption rate of the particular monomer with time. Preferably, the rate of addition of monomer will equal the rate of consumption of monomer, that is conversion of monomer into polymer.

The reaction kettle is charged with water, the amounts of which are not critical. To the aqueous phase there is generally also added a fluorinated surfactant, typically a non-telogenic fluorinated surfactant although aqueous emulsion polymerization without the addition of fluorinated surfactant may also be practiced. Suitable fluorinated surfactants include any fluorinated surfactant commonly employed in aqueous emulsion polymerization.

In one embodiment, a fluorinated surfactant may be used which corresponds to the general formula:

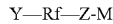

wherein Y represents hydrogen, Cl or F; $R_f$ represents a linear or branched perfluorinated alkylene having 4 to 10 carbon atoms; Z represents $COO^-$ or $SO_3^-$ and M represents an alkali metal ion or an ammonium ion. Such fluorinated surfactants include fluorinated alkanoic acid and fluorinated alkanoic sulphonic acids and salts thereof, such as ammonium salts of perfluorooctanoic acid and perfluorooctane sulphonic acid. Also contemplated for use in the preparation of the polymers described herein are fluorinated surfactants of the general formula:

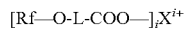

wherein L represents a linear partially or fully fluorinated alkylene group or an aliphatic hydrocarbon group, Rf represents a linear partially or fully fluorinated aliphatic group or a linear partially or fully fluorinated group interrupted with one or more oxygen atoms, $X^{i+}$ represents a cation having the valence i and i is 1, 2 and 3. In one embodiment, the emulsifier is selected from $CF_3-O-(CF_2)_3-O-CHF-CF_2-C(O)OH$ and salts thereof. Specific examples are described in US 2007/0015937, which is incorporated herein by reference. Exemplary emulsifiers include: $CF_3CF_2OCF_2CF_2OCF_2COOH$, $CHF_2(CF_2)_5COOH$, $CF_3$ $(CF_2)_6COOH$, $CF_3O(CF_2)_3OCF(CF_3)COOH$, $CF_3CF_2CH_2OCF_2CH_2OCF_2COOH$, $CF_3O(CF_2)_3OCHFCF_2COOH$, $CF_3O(CF_2)_3OCF_2COOH$, $CF_3(CF_2)_3(CH_2CF_2)_2CF_2CF_2CF_2COOH$, $CF_3(CF_2)_2CH_2(CF_2)_2COOH$, $CF_3(CF_2)_2COOH$, $CF_3(CF_2)_2(OCF(CF_3)CF_2)OCF(CF_3)COOH$, $CF_3(CF_2)_2(OCF_2CF_2)_4OCF(CF_3)COOH$, $CF_3CF_2O(CF_2CF_2O)_3CF_2COOH$, and their salts.

Also contemplated for use in the preparation of the highly fluorinated polymers described herein are fluorinated polyether surfactants, such as described in U.S. Pat. No. 6,429,258.

In yet another embodiment, polymerizable fluorinated emulsifiers according to the following formula can be used in the preparation of the polymers described herein

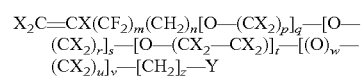

where X is independently selected from H, F, or CF3; Y is COOM or $SO_3M$; wherein the polymerizable fluorinated emulsifier comprises at least 1 fluorine atom. M is H, an alkali metal (e.g., Na, Ca, etc.), or NH4. Subscript m is 0-6, 0-5, 0-4; 0-3, or even 0-2. Subscript n is 0-6, 0-5, 0-4; 0-3, or even 0-2. Subscript p is at least 1, 2, 3, 4, or even 5; and no more than 20, 10, 8, or even 6. Subscript q is 0-6, 0-5, 0-4; 0-3, or even 0-2. Subscript r is 0-6, 0-5, 0-4; 0-3, or even 0-2. Subscript s is 0-6, 0-5, 0-4; 0-3, or even 0-2. Subscript t is 0-6, 0-5, 0-4; 0-3, or even 0-2. Subscript u is 0-6, 0-5, 0-4; 0-3, or even 0-2. Subscript v is 0-6, 0-5, 0-4; 0-3, or even 0-2. Subscript w is 0 or 1. Subscript z is 0-6, 0-5, 0-4; 0-3, or even 0-2. At least one of m, n, q, s, t, u, v, and z is at least 1. These fluorinated emulsifiers are able to be polymerized into the polymer during the polymerization.

Exemplary emulsifiers include fluorinated allyl and vinyl ethers including: $CF_2=CF-(CF_2)_m-O-(CF_2)_p-O-(CF2)r-Y$; $CF_2=CF-(CF_2)_m-O-(CF_2)_p-CH_2-Y$; $CF_2=CF-(CF_2)_m-O-(CF_2)_p-[O-CF[CF_3]-CF_2]_t-O-CF(CF_3)-Y$; $CF_2=CF-(CF_2)_m-O-(CF_2)_p-O-CHF-CF_2-Y$; and $CF_2=CF-(CF_2)_m-O-(CF_2)_p-O-CHF-Y$. where Y is COOM or SO3M. M is H, an alkali metal, or NH4. Subscript m is an integer from 0-6. Subscript r is an integer from 0-6. Subscript t is an integer from 0-6. Subscript p is an integer from 1-6. Exemplary emulsifiers also include fluorinated olefins such as:

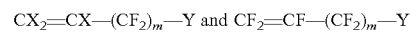

where X is independently selected from H, F, or CF3 and Y is COOM or SO3M. M is H, an alkali metal, or NH4. Subscript m is an integer from 1-6. In one embodiment, at least one of X in the fluorinated olefin is a H. In one embodiment, at least one of X in the fluorinated olefin contains a F atom. These emulsifiers are described in U.S. Pat. Appl. Nos. 61/732,966 and 61/732,967, filed Dec. 4, 2012, herein incorporated by reference.

These fluorinated surfactants may be used alone or in combination as a mixture of two or more of them. The amount of the surfactant is generally within a range of 250 to 5,000 ppm (parts per million), preferably 250 to 2000 ppm, more preferably 300 to 1000 ppm, based on the mass of water to be used.

In one embodiment, the polymerization is substantially free of an emulsifier comprising an acid or salt. Such emulsifiers include fluorinated alkanoic acids and salts thereof; fluorinated alkanoic sulphonic acids and salts thereof; fluoroethoxy alkanoic acids and salts thereof; and combinations thereof. As used here, substantially free of an emulsifier, means less than 0.1%, 0.05%, 0.01%, or even 0.001% by weight of the emulsifier versus the total weight of the dispersion is present, or even no emulsifier is detected in the resulting dispersion.

The fluorinated di-iodo ether compound of the present disclosure may be initially charged to the reaction kettle and/or subsequently added in a continuous or semi-continuous way during the polymerization. Typically, the amount of fluorinated di-iodo ether compound of formula I added will be at least 0.01, 0.05, or even 0.1% by weight and at most 0.5, 0.75, 1, 2, 3, 4, or even 5% by weight relative to the total weight of monomers fed into the reaction kettle.

In one embodiment, a cure site monomer may also be added to the reaction kettle, which are incorporated into the polymer during polymerization and are then used as sites to subsequently crosslink polymer chains.

In one embodiment, an additional chain transfer agent may be used to control the molecular weight of the fluoropolymer so as to obtain the desired zero shear rate viscosity and/or to introduce halogens (I or Br) at a terminal position of the polymer chain. Examples of suitable chain transfer agents in addition to those of Formula I include those having the formula $R_fP_x$, wherein P is Br or I, preferably I, $R_f$ is an x-valent alkyl radical having from 1 to 12 carbon atoms, which, optionally may also contain chlorine atoms. Typically, x is 1 or 2. Useful chain transfer agents include perfluorinated alkyl monoiodide, perfluorinated alkyl diiodide, perfluorinated alkyl monobromide, perfluorinated alkyl dibromide, perfluorinated alkyl monobromide monoiodide, and combinations thereof. Specific examples include $CF_2Br_2$, $Br(CF_2)_2Br$, $Br(CF_2)_4Br$, $CF_2ClBr$, $CF_3CFBrCF_2Br$, $I(CF_2)_nI$ wherein n is an integer from 1-10 (e.g., $I(CF_2)_4I$), $Br(CF_2)_nI$ wherein n is an integer from 1-10 (e.g., $Br(CF_2)_2I$), and combinations thereof.

The polymerization is usually initiated after an initial charge of monomer by adding an initiator or initiator system to the aqueous phase. For example, peroxides can be used as free radical initiators. Specific examples of peroxide initiators include, hydrogen peroxide, diacylperoxides such as diacetylperoxide, dipropionylperoxide, dibutyrylperoxide, dibenzoylperoxide, benzoylacetylperoxide, diglutaric acid peroxide and dilaurylperoxide, and further water soluble per-acids and water soluble salts thereof such as for example ammonium, sodium or potassium salts. Examples of per-acids include peracetic acid. Esters of the peracid can be used as well and examples thereof include tertiary-butylperoxyacetate and tertiary-butylperoxypivalate. A further class of initiators that can be used are water soluble azo-compounds. Suitable redox systems for use as initiators include for example a combination of peroxodisulphate and hydrogen sulphite or disulphite, a combination of thiosulphate and peroxodisulphate or a combination of peroxodisulphate and hydrazine. Further initiators that can be used are ammonium-alkali- or earth alkali salts of persulfates, permanganic or manganic acid or manganic acids. The amount of initiator employed is typically between 0.001 and 2% by weight, preferably between 0.005 and 1% by weight based on the total weight of the polymerization mixture. The full amount of initiator may be added at the start of the polymerization or the initiator can be added to the polymerization in a continuous way during the polymerization until a conversion of 70 to 80%. One can also add part of the initiator at the start and the remainder in one or separate additional portions during the polymerization. Accelerators such as for example water-soluble salts of iron, copper, and silver may also be added.

During the initiation of the polymerization reaction, the sealed reactor kettle and its contents are conveniently pre-heated to the reaction temperature. Polymerization temperatures may be from 20° C., from 30° C., or even from 40° C. and may further be up to 100° C., up to 110° C., or even up to 150° C. The polymerization pressure may range, for instance, from 4 to 30 bar, in particular from 8 to 20 bar. The aqueous emulsion polymerization system may further comprise auxiliaries, such as buffers and complex-formers.

In one embodiment, a co-solvent may be used to generate small droplets of the diiodo-compounds, for example in the use of a pre-emulsion or hot aerosol spray. Co-solvents are usually fluorinated organic liquids with boiling points of at least 10° C., 20° C., or even 30° C. However, as mentioned previously, because the fluorinated di-iodo ether compound is more soluble in water compared to their fluorinated hydrocarbon analogs, co-solvents may not be necessary when using the diiodo-compounds of the present disclosure. Therefore, in one embodiment, the polymerization and is conducted in the absence of an organic solvent.

The amount of polymer solids that can be obtained at the end of the polymerization is typically at least 10% by weight, or even at least 20% by weight, and up to 40% by weight, and even up to 45% by weight; and the average particle size of the resulting fluoropolymer is typically between 50 nm and 500 nm, preferably between 80 nm to 250 nm.

In one embodiment, the resulting dispersion comprising the highly fluorinated polymer is substantially free of a solvent, meaning that less than 1% is present by weight based on the total weight of the dispersion.

In one embodiment, the resulting dispersion comprising the highly fluorinated polymer is substantially free of a fluorinated emulsifier, meaning that less than 0.1%, 0.05%, 0.01%, or even 0.001% or even none is present by weight of a fluorinated emulsifier based on the total weight of the dispersion.

After polymerization, the dispersion comprising the highly fluorinated polymer may be coagulated and washed as is known in the art to form a polymer gum.

The resulting polymers of the present disclosure are highly fluorinated polymers, wherein a polymer is a macromolecule having a molecular weight of at least 10000 g/mole. The polymers are highly fluorinated, meaning that the polymer comprise at least 50%, at least 60%, or even at least 70% and at most 76% fluorine on a weight basis compared to the total weight of the polymer.

The highly fluorinated polymers of the present disclosure comprise terminal groups. As used herein the term "terminal group" of a polymer comprises both end groups (i.e., groups that are at end positions of the polymer backbone) as well as side groups (i.e., groups that are pending on the backbone of the polymer). The polymer chain will at a minimum comprise one terminal group (i.e., the two end groups). If the polymer chain comprises branching, than the polymer chain will comprise more than two terminal groups.

When the fluorinated polymer, made using the diiodo-compounds of the present disclosure, is derived from a hydrogen containing monomer (e.g., VDF, ethylene, propylene, etc.), it has been discovered that fluorinated polymer comprises at least one —$CH_2I$ terminal group (e.g., at least 2, at least 4, at least 6, at least 8, or even at least 10). The presence of —$CH_2I$ terminal groups may be detectable by standard $^{19}F$ NMR techniques, searching in the area of −38 to −40 ppm using a $C^{19}FCl_3$ reference, as described by Boyer et al. in Macromolecules, 2005, Vol. 38, 10353-10362.

In one embodiment of the present disclosure, the highly fluorinated polymers disclosed herein comprise 1 or more iodine atoms per polymer chain (e.g., 2, 3, 4, 5 or even more iodine atoms per polymer chain), indicating that the iodine is being incorporated into the fluoropolymer during polymerization When discussing cross-linking of highly fluorinated polymers, bromine or iodine atoms are incorporated into the polymer chain during polymerization to allow for subsequent points for cross-linking. In the present disclosure, although not wanting to be limited by theory, it is believed that iodine atoms are incorporated into the highly fluorinated polymer through the fluorinated di-iodo ether compound of Formula I, which acts as a chain transfer agent. Additional iodine atoms may also be incorporated using an iodine-containing cure site monomer.

In one embodiment the resulting highly fluorinated polymer comprises 0.01 to 3 wt % of iodine. In one embodiment, the highly fluorinated polymer of the present disclosure comprises at least 0.05, 0.1, 0.2 or even 0.3% by weight iodine relative to the total weight of the polymer gum. In one embodiment the highly fluorinated polymer gum of the present disclosure comprises at most 0.4, 0.5, or even 0.75% by weight iodine relative to the total weight of the highly fluorinated polymer gum. These iodine groups are thought to be either terminal end groups, resulting from an iodinated chain transfer agent and/or end groups from an iodine-containing cure site monomer. These iodine groups may then be used to cross-link the highly fluorinated elastomer gum. In one embodiment, a cure site monomer may not be necessary even when manufacturing fluoroelastomeric compositions. However, in other embodiments, it may be desirable to include cure site monomers to increase the amount of cure sites in the fluoropolymer.

The highly fluorinated polymer of the present disclosure typically have Mooney viscosities (ML 1+10 at 121° C.) of greater than 5, 10, 15, 20, 30, 40, 50, 60, 80, or even 100 units and no greater than 150 units. The Mooney viscosity can be determined, for example, according to ASTM D-1646-07 (2012). The fluoroelastomers may have a monomodal or bi-modal or multi-modal weight distribution.

It has been discovered that the by using specific combinations of monomers and polymerization conditions, highly fluorinated elastomer gums of the present disclosure may be achieved having beneficial results. For example, it has been found, that the use of specific monomers and polymerization conditions result in a highly fluorinated elastomer composition having particularly good compression set.

In one embodiment, the highly fluorinated elastomer gum in particular has a low presence of carbonyl content.

The carbonyl content of the highly fluorinated elastomer gum may be determined by an integrated absorbance ratio method based on Fourier transform infrared analysis (FTIR).

This method may also be used to determine the carboxyl, carboxylate, and carboxamide groups and relies on the baseline corrected integrated absorption underneath prominent peaks in the FT-IR spectrum of a pressed film of the highly fluorinated elastomer gum. In particular, the integrated absorbance of the most prominent peaks between approximately 1620 cm$^{-1}$ to 1840 cm$^{-1}$ are measured. These peaks correspond to absorbances attributable to carbonyl moieties present in the polymer. This baseline corrected integrated absorbance under the most intense peaks within the range of 1620 cm$^{-1}$ and 1840 cm$^{-1}$ is divided by the baseline corrected integrated absorbance of the C—F stretch overtone between 2220 cm$^{-1}$, and 2740 cm$^{-1}$, which is indicative of the thickness of the sample. This gives the carbonyl absorbance ratio which characterizes the carboxyl, carboxylate, and carboxamide content of the polymer. The polymers useful in this disclosure have an integrated absorbance ratio less than 0.07, less than 0.04, or even less than 0.03. Such measurement techniques are described in U.S. Pat. No. 6,114,452 (Schmiegel) and U.S. Pat. No. 8,604,137 (Grootaert et al.), herein incorporated by reference.

The presence of acidic end-groups is known to be detrimental to certain properties of the fluoropolymer. Thus, heating techniques have previously been used to convert carboxylate end groups to non-ionic endgroups. Although these carboxylate end groups are converted to non-ionic acid fluoride end groups, these acid fluoride end groups can be slowly hydrolyzed by ambient water in the environment and as such are converted back to carboxyl end groups. Thus, although a fluoropolymer may have a low integrated absorbance ratio after a heat treatment, over time the integrated absorbance ratio can increase. Because of the monomers selected and the polymerization methods employed, the fluoroelastomers of the present disclosure in one embodiment have a minimal amount of ionic endgroups and thus, they do not require a heat treatment step to achieve the low integrated absorbance ratio disclosed herein.

It is believed that in one embodiment, the highly fluorinated elastomer gums have a polymer architecture that favorably influences the mechanical properties and/or the curing behavior of the highly fluorinated elastomer by generating branched polymers, particularly when used in small amounts.

The level of branching or non-linearity can be characterized through the long chain branching index (LCBI). The LCBI can be determined as described in R. N. Shroff, H. Mavridis; *Macromol.*, 32, 8464-8464 (1999) & 34, 7362-7367 (2001) according to the equation:

$$LCBI = \frac{\eta_{0,br.}^{1/a}}{[\eta]_{br.}} \cdot \frac{1}{k^{1/a}} - 1 \qquad \text{eq. 1}$$

In the above equation, $\eta_{0,br}$ is the zero shear viscosity (units Pa*s) of the branched polymer measured at a temperature T and $[\eta]_{br}$ is the intrinsic viscosity (units ml/g) of the branched polymer at a temperature T' in a solvent in which the branched polymer can be dissolved and a and k are constants. These constants are determined from the following equation:

$$\eta_{0,lin} = k \cdot [\eta]_{lin}^a. \qquad \text{eq. 2}$$

wherein $\eta_{0,lin}$ and $[\eta]_{lin}$ represent respectively the zero shear viscosity and intrinsic viscosity of the corresponding linear polymer measured at the respective same temperatures T and T' and in the same solvent. Thus, the LCBI is independent of the selection of the measurement temperatures and solvent chosen provided of course that the same solvent and temperatures are used in equations 1 and 2. The zero shear viscosity and intrinsic viscosity are typically determined on freeze coagulated polymers.

The LCBI of the fluoropolymer used should have a value of at least 0.2. However, when the level of branching (and thus the LCBI value) becomes too large, the polymer may have a gel fraction that cannot be dissolved in an organic solvent. One skilled in the art through routine experimentation may readily determine the appropriate value of LCBI. Generally, the LCBI will be between 0.2 and 5, preferably between 0.5 and 1.5. In one embodiment, the LCBI is greater than 0.2, 0.5, 1, 1.5, 2, 2.5, 4, or even 6.

In one embodiment of the present disclosure, the compositions of the present disclosure comprise a higher LCBI value, than the same polymer prepared with an alternate branching agent, such as a halogenated olefin.

The elastomers provided herein are highly fluorinated. In other words, all of the C—H bonds in the polymer backbone are replaced by C—F bond, although the end groups may or may not be fluorinated. In one embodiment, the polymer of the present disclosure are highly fluorinated meaning that 80%, 90%, 95%, 99% or even 100% of the C—H bonds in the polymer backbone are replaced by C—F or C—I bonds. The fluoroelastomer gums may be cured (cross-linked) or uncured (non-crosslinked). Typically, fluoroelastomer are amorphous. Typically they do not have a melting peak. Generally, they have a glass transition temperature (Tg) of up to 25° C., and preferably below 0° C.

Curing

The highly fluorinated elastomer gum described above may be used to make curable highly fluorinated elastomer compositions. The curable highly fluorinated elastomer compositions contain curable highly fluorinated elastomer gums and one or more peroxide cure systems. The peroxide cure systems typically include an organic peroxide. The peroxide will cause curing of the highly fluorinated elastomer to form a cross-linked (cured) fluoroelastomer when activated. Suitable organic peroxides are those which generate free radicals at curing temperatures. A dialkyl peroxide or a bis(dialkyl peroxide) which decomposes at a temperature above 50° C. is especially preferred. In many cases it is preferred to use a di-tertiarybutyl peroxide having a tertiary carbon atom attached to the peroxy oxygen. Among the most useful peroxides of this type are 2,5-dimethyl-2,5-di(tertiarybutylperoxy)hexyne-3 and 2,5-dimethyl-2,5-di(tertiarybutylperoxy)hexane. Other peroxides can be selected from compounds such as but not limited to dicumyl peroxide, dibenzoyl peroxide, tertiarybutyl perbenzoate, alpha,alpha'-bis(t-butylperoxy-diisopropylbenzene), and di[1,3-dimethyl-3-(t-butylperoxy)-butyl]carbonate. Generally, about 1 to 5 parts of peroxide per 100 parts of highly fluorinated elastomer may be used.

The curing agents may be present on carriers, for example silica containing carriers.

A peroxide cure system may also include one or more coagent. Typically, the coagent includes a polyunsaturated compound which is capable of cooperating with the peroxide to provide a useful cure. These coagents can be added in an amount between 0.1 and 10 parts per hundred parts fluoropolymer, preferably between 2 and 5 parts per hundred parts fluoropolymer. Examples of useful coagents include triallyl cyanurate; triallyl isocyanurate; triallyl trimellitate; tri(methylallyl)isocyanurate; tris(diallylamine)-s-triazine; triallyl phosphite; N,N-diallyl acrylamide; hexaallyl phosphoramide; N,N,N',N'-tetraalkyl tetraphthalamide; N,N,N', N'-tetraallyl inalonamide; trivinyl isocyanurate; 2,4,6-trivinyl methyltrisiloxane; N,N'-m-phenylenebismaleimide; diallyl-phthalate and tri(5-norbornene-2-methylene)cyanurate. Particularly useful is triallyl isocyanurate.

The curable highly fluorinated elastomer composition may further contain acid acceptors. Acid acceptors may be added to improve the fluoroelastomers steam and water resistance. Such acid acceptors can be inorganic or blends of inorganic and organic acid acceptors. Examples of inorganic acceptors include magnesium oxide, lead oxide, calcium oxide, calcium hydroxide, dibasic lead phosphate, zinc oxide, barium carbonate, strontium hydroxide, calcium carbonate, hydrotalcite, etc. Organic acceptors include epoxies, sodium stearate, and magnesium oxalate. Particularly suitable acid acceptors include magnesium oxide and zinc oxide. Blends of acid acceptors may be used as well. The amount of acid acceptor will generally depend on the nature of the acid acceptor used.

In one embodiment, an acid acceptor is used between 0.5 and 5 parts per 100 parts of highly fluorinated elastomer. In one embodiment of the present disclosure, an acid acceptor is not needed and the highly fluorinated elastomer composition is essentially free an acid acceptor. In one embodiment of the present disclosure, a metal-containing acid acceptor is not needed and the curable highly fluorinated elastomer composition is essentially free of a metal-containing acid acceptor. As used herein, essentially free of an acid acceptor or essentially free of a metal-containing acid acceptor means less than 0.01, 0.005, or even 0.001 parts per 100 parts of the highly fluorinated elastomer or even none present.

The curable highly fluorinated elastomer compositions may be prepared by mixing the highly fluorinated polymer, a peroxide curing agent and optionally additives in conventional rubber processing equipment to provide a solid mixture, i.e. a solid polymer containing the additional ingredients, also referred to in the art as a "compound". This process of mixing the ingredients to produce such a solid polymer composition containing other ingredients is typically called "compounding". Such equipment includes rubber mills, internal mixers, such as Banbury mixers, and mixing extruders. The temperature of the mixture during mixing typically will not rise above about 120° C. During mixing the components and additives are distributed uniformly throughout the resulting fluorinated polymer "compound" or polymer sheets. The "compound" can then be extruded or pressed in a mold, e.g., a cavity or a transfer mold and subsequently be oven-cured. In an alternative embodiment curing can be done in an autoclave.

Curing is typically achieved by heat-treating the curable highly fluorinated elastomer composition. The heat-treatment is carried out at an effective temperature and effective time to create a cured fluoroelastomer. Optimum conditions can be tested by examining the cured highly fluorinated elastomer for its mechanical and physical properties. Typically, curing is carried out at temperatures greater than 120° C. or greater than 150° C. Typical curing conditions include curing at temperatures between 160° C. and 210° C. or between 160° C. and 190° C. Typical curing periods include from 3 to 90 minutes. Curing is preferably carried out under pressure. For example pressures from 10 to 100 bar may be applied. A post curing cycle may be applied to ensure the curing process is fully completed. Post curing may be carried out at a temperature between 170° C. and 250° C. for a period of 1 to 24 hours. Peroxide curing agents include organic peroxides. In many cases it is preferred to use a tertiary butyl peroxide having a tertiary carbon atom attached to a peroxy oxygen.

Exemplary peroxides include: 2,5-dimethyl-2,5-di(t-butylperoxy)hexane; dicumyl peroxide; di(2-t-butylperoxyisopropyl)benzene; dialkyl peroxide; bis (dialkyl peroxide); 2,5-dimethyl-2,5-di(tertiarybutylperoxy)3-hexyne; dibenzoyl peroxide; 2,4-dichlorobenzoyl peroxide; tertiarybutyl perbenzoate; di(t-butylperoxy-isopropyl)benzene; t-butyl peroxy isopropylcarbonate, t-butyl peroxy 2-ethylhexyl carbonate, t-amyl peroxy 2-ethylhexyl carbonate, t-hexylperoxy isopropyl carbonate, di[1,3-dimethyl-3-(t-butylperoxy) butyl] carbonate, carbonoperoxoic acid, O,O'-1,3-propanediyl OO,OO'-bis(1,1-dimethylethyl) ester, and combinations thereof.

The amount of peroxide curing agent used generally will be at least 0.1, 0.2, 0.4, 0.6, 0.8, 1, 1.2, or even 1.5; at most 2, 2.25, 2.5, 2.75, 3, 3.5, 4, 4.5, 5, or even 5.5 parts by weight per 100 parts of highly fluorinated polymer.

In peroxide cure systems, it is often desirable to include a coagent. Those skilled in the art are capable of selecting conventional coagents based on desired physical properties. Exemplary coagents include: tri(methyl)allyl isocyanurate (TMAIC), triallyl isocyanurate (TAIC), tri(methyl)allyl cyanurate, poly-triallyl isocyanurate (poly-TAIC), triallyl cyanurate (TAC), xylylene-bis(diallyl isocyanurate) (XBD), N,N'-m-phenylene bismaleimide, diallyl phthalate, tris(diallylamine)-s-triazine, triallyl phosphite, 1,2-polybutadiene, ethyleneglycol diacrylate, diethyleneglycol diacrylate, and combinations thereof. Another useful coagent may be represented by the formula CH2=CH—Rf1-CH=CH2 wherein Rf1 may be a perfluoroalkylene of 1 to 8 carbon atoms. Such coagents provide enhanced mechanical strength to the final cured elastomer. They generally are used in amount of at least 0.5, 1, 1.5, 2, 2.5, 3, 4, 4.5, 5, 5.5, or even 6; at most 4, 4.5, 5, 5.5, 6, 7, 8, 9, 10, 10.5, or even 11 parts by weight per 100 parts of the fluoropolymer.

The highly fluorinated polymer compositions can also contain a wide variety of additives of the type normally used in the preparation of elastomeric compositions, such as pigments, fillers (such as carbon black), pore-forming agents, and those known in the art.

Metal oxides are traditionally used in peroxide curing. Exemplary metal oxides include: Ca(OH)2, CaO, MgO, ZnO, and PbO. In one embodiment, the curable fluoropolymer is essentially free of metal oxide (i.e., the composition comprises less than 1, 0.5, 0.25, 0.1, or even less than 0.05 parts per 100 parts of the fluoroelastomer). In one embodiment, the curable fluoropolymer comprises metal oxide. For example, at least 1.5, 2, 4, 5, or even 6 parts metal oxide per 100 parts of the fluoropolymer.

In the present curing process, the highly fluorinated polymer gum, along with the required amounts of peroxide, coagent, and other components (such as filler, pigments, plasticizers, lubricants and the like), is compounded by conventional means, such as in a two-roll mill, at elevated temperatures. The fluoropolymer gum is then processed and shaped (for example, in the shape of a hose or hose lining) or molded (for example, in the form of an O-ring). The shaped article can then be heated to cure the gum composition and form a cured elastomeric article.

The cured highly fluorinated elastomers are particularly useful as seals, gaskets, and molded parts in systems that are exposed to elevated temperatures and/or corrosive materials, such as in automotive, chemical processing, semiconductor, aerospace, and petroleum industry applications, among others. Because the fluoroelastomers may be used in sealing applications, it is important that the elastomers perform well under compression. Compressive sealing is based on the ability of an elastomer to be easily compressed and develop a resultant force that pushes back on the mating surfaces. The ability of a material to maintain this resultant force as a function of time over a range of environmental conditions is important to long term stability. As a result of thermal expansion, stress relaxation, and thermal aging, the initial sealing forces will decay over time. By determining the retained sealing force, elastomeric materials can be evaluated for their sealing force retention under a range of conditions, particularly under high temperature conditions, such as 200° C., 225° C., 250° C., and even 275° C.

EXAMPLES

Advantages and embodiments of this disclosure are further illustrated by the following examples, but the particular materials and amounts thereof recited in these examples, as well as other conditions and details, should not be construed to unduly limit this invention. In these examples, all percentages, proportions and ratios are by weight unless otherwise indicated.

All materials were obtained or are available, from general chemical suppliers such as, for example, Sigma-Aldrich Company, Saint Louis, Mo., or Anles, St. Petersburg, Russia, or may be synthesized by conventional methods.

These abbreviations are used in the following examples: phr=parts per hundred rubber; g=grams, min=minutes, mol=mole; mmol=millimole, hr or h=hour, ° C.=degrees Celsius, mL=milliliter, L=liter, psi=pounds per square inch, psig=pounds per square inch gauge; MPa=Mega-Pascals, GCMS=gas chromatography mass spectroscopy, NMR=nuclear magnetic resonance, and N-m=Newton-meter.

Determination of Iodine Content:

The iodine content was determined by elemental analysis using an ASC-240 S auto sampler from Enviroscience (Düsseldorf/Germany), an Enviroscience AQF-2100 F combustion unit (software: "NSX-2100, version 1.9.8"; Mitsubishi Chemical Analytech Co., LTD.) an Enviroscience GA-210 gas absorption unit and a Metrohm "881 compac IC pro" liquid chromatography analyzer (software: Metrohm "Magic IC Net 2.3", Riverview, Fla.). The iodine content is reported as the wt % versus the weight of the fluoropolymer.

Determination of Polymer Composition:

$^{19}$F nuclear magnetic resonance (NMR) spectra were recorded with a Bruker Avance 400 (400.13 MHz) instrument (Billerica, Mass.). The partially fluorinated polymers were dissolved in acetone-d6 and the perfluorinated polymers in perfluorobenzene at a concentration of typically 50 mg/ml, 3000 scans per measurement were usually applied.

Integrated Absorbance Ratio Method:

The integrated absorbance ratio was determined by calculating the ratio of the integrated peak intensity within the range of 1620-1840 cm$^{-1}$ to that within the range of 2220-2740 cm$^{-1}$, as measured on a Fourier transform infrared spectrometer.

Mooney Viscosity Method:

The Mooney viscosity values were measured in a similar manner as ASTM D 1646-06 Type A by a MV2000 instrument (available from Alpha Technologies, Ohio) using large rotor (ML 1+10) at 121° C. Results are reported in Mooney units.

Determination of Glass Transition Temperature:

ASTM D 4591 "Standard Test Method for Determining Temperatures and Heats of Transitions of Fluoropolymers by Differential Scanning calorimetry".

Comparative Example (Comp. Ex.)

Under oxygen-free condition a 40 Liter kettle was charged with 28 L deionized water. 180 g CF—O—(CF$_2$)$_3$—O—CFH—CF$_2$—COONH$_4$ was added as emulsifier. After heating to 80° C., 570 g tetrafluoroethene (TFE), 2160 g perfluoromethylvinylether (PMVE), and 43 g 1,4-diiodooctafluorobutane were added. The reaction was initiated with addition of 5 g ammonium peroxodisulphate (APS) dissolved in 50 mL deionized water by continuously feeding. At 17 bar pressure and 80° C. 5850 g TFE, 6560 g PMVE, and 64 g perfluoro-[(6-iodo-4-oxa-hexyl)-vinyl]-ether (MV32-I) were fed over a period of 185 min. The resulting latex had a solid content of 30% and was coagulated using MgSO$_4$. The resulting 12 kg polymer was dried at 120° C.

The composition of the resulting polymer was 62.3 mole % TFE and 37.7 mole % PMVE based on NMR with 0.37 wt % iodine based on ion chromatography. The iodine is resulting from the iodine-containing chain transfer agent and/or the iodine-containing cure site monomer (CSM). The calculated amount of the iodinated CSM MV32-I is 0.11 mole %, which corresponds to 0.13 wt % iodine. The resulting polymer has an integrated absorbance ratio of 0.047 and a Mooney-Viscosity (1+10', 121° C.) of 36. The glass transition temperature (Tg) was −4° C.

Example 1

Under oxygen-free condition a 40 Liter kettle was charged with 28 L deionized water. 540 g $CF_3$—O—$(CF_2)_3$—O—CFH—$CF_2$—$COONH_4$ was added as emulsifier. After heating to 80° C. 430 g tetrafluoroethene (TFE), 2370 g perfluoromethylvinylether (PMVE), and 113 g 1,9-diiodo-3,7-dioxa-tetradecafluorononane were added. The reaction was initiated with addition of 5 g ammonium peroxodisulphate (APS) dissolved in 50 mL deionized water by continuously feeding. At 17 bar pressure and 80° C. 5850 g TFE, 6570 g PMVE, and 64 g perfluoro-[(6-iodo-4-oxa-hexyl)-vinyl]-ether (MV32-I) were fed over a period of 540 min. The resulting latex had a solid content of 30% and was coagulated using MgSO4. The resulting 11 kg polymer was dried at 120° C.

The composition of the resulted polymer was 61.4 mole % TFE, 38.6 mole % PMVE, and 0.32 wt % iodine. The iodine is resulting from the iodine-containing chain transfer agent and/or the iodine-containing cure site monomer (CSM). The calculated amount of the iodinated CSM MV32-I is 0.13 mole %, which corresponds to 0.11 wt % iodine versus total fluoropolymer. The endgroup ratio was 0.036 and Mooney-Viscosity (1+10', 121° C.) was 79. The glass transition temperature (Tg) was −7° C.

Example 2

Under oxygen-free condition a 40 Liter kettle was charged with 28 L deionized water. 180 g $CF_3$—O—$(CF_2)_3$—O—CFH—$CF_2$—$COONH_4$ was added as emulsifier. After heating to 80° C. 450 g tetrafluoroethene (TFE), 2430 g perfluoromethylvinylether (PMVE), and 74 g 1,9-diiodo-3,7-dioxa-tetradecafluorononane were added. The reaction was initiated with addition of 5 g ammonium peroxodisulphate (APS) dissolved in 50 mL deionized water by continuously feeding. At 17 bar pressure and 80° C. 5850 g TFE, 6560 g PMVE, and 64 g perfluoro-[(6-iodo-4-oxa-hexyl)-vinyl]-ether (MV32-I) were fed over a period of 180 min. The resulting latex had a solid content of 30% and was coagulated using MgSO4. The resulting 11 kg polymer was dried at 120° C.

The composition of the resulted polymer was 61.6 mole % TFE, 38.4 mole % PMVE, and 0.23 wt % iodine. The iodine is resulting from the iodine-containing chain transfer agent and/or the iodine-containing cure site monomer (CSM). The calculated amount of the iodinated CSM MV32-I is 0.13 mole %, which corresponds to 0.11 wt % iodine versus total fluoropolymer. The endgroup ratio was 0.026 and Mooney-Viscosity (1+10', 121° C.) was 90. The glass transition temperature (Tg) was −5° C.

Example 3

Under oxygen-free condition a 40 Liter kettle was charged with 28 L deionized water. 180 g $CF_3$—O—$(CF_2)_3$—O—CFH—$CF_2$—$COONH_4$ was added as emulsifier. After heating to 80° C. 460 g tetrafluoroethene (TFE), 2460 g perfluoromethylvinylether (PMVE), 75 g 1,9-diiodo-3,7-dioxa-tetradecafluorononane, and 76 g $CF_3CF_2CF_2O$[$CF(CF_3)CF_2O$]$_4$—CFH—$CF_3$ were added. The reaction was initiated with addition of 5 g ammonium peroxodisulphate (APS) dissolved in 50 mL deionized water by continuously feeding. At 17 bar pressure and 80° C. 5850 g TFE, 6560 g PMVE, and 64 g perfluoro-[(6-iodo-4-oxa-hexyl)-vinyl]-ether (MV32-I) were fed over a period of 260 min. The resulting latex had a solid content of 30% and was coagulated using MgSO4. The resulting 11 kg polymer was dried at 120° C.

The composition of the resulted polymer was 61.9 mole % TFE, 38.1 mole % PMVE, and 0.31 wt % iodine. The iodine is resulting from the iodine-containing chain transfer agent and/or the iodine-containing cure site monomer (CSM). The calculated amount of the iodinated CSM MV32-I is 0.13 mole %, which corresponds to 0.11 wt % iodine versus total fluoropolymer. The endgroup ratio was 0.031 and Mooney-Viscosity (1+10', 121° C.) was 61. The glass transition temperature (Tg) was −7° C.

Example 4

Under oxygen-free condition a 40 Liter kettle was charged with 28 L deionized water. 180 g $CF_3$—O—$(CF_2)_3$—O—CFH—$CF_2$—$COONH_4$ was added as emulsifier. After heating to 90° C. 420 g tetrafluoroethene (TFE), 2280 g perfluoromethylvinylether (PMVE), and 74 g 1,9-diiodo-3,7-dioxa-tetradecafluorononane were added. The reaction was initiated with addition of 1 g ammonium peroxodisulphate (APS) dissolved in 50 mL deionized water by continuously feeding. At 17 bar pressure and 90° C. 5850 g TFE, 6560 g PMVE, 64 g perfluoro-[(6-iodo-4-oxa-hexyl)-vinyl]-ether (MV32-I) and 3.7 g APS dissolved in 50 mL deionized water were fed over a period of 245 min. The resulting latex had a solid content of 30% and was coagulated using MgSO4. The resulting 11 kg polymer was dried at 120° C.

The composition of the resulted polymer was 61.5 mole % TFE, 38.5 mole % PMVE, and 0.27 wt % iodine. The iodine is resulting from the iodine-containing chain transfer agent and/or the iodine-containing cure site monomer (CSM). The calculated amount of the iodinated CSM MV32-I is 0.13 mole %, which corresponds to 0.11 wt % iodine versus total fluoropolymer. The endgroup ratio was 0.032 and Mooney-Viscosity (1+10', 121° C.) was 49. The glass transition temperature (Tg) was −6° C.

Compound Formulation

As described in the following, the polymers of each sample were press-cured using a peroxide cure package and various physical properties were measured. In each case, 100 parts of the polymer from the examples above were mixed on a two roll mill with 25 parts carbon black N-990 available under the trade designation "THERMAX FLO-FORM MEDIUM THERMAL CARBON BLACK N990", ASTM N990 from Cancarb Ltd., Medicine Hat, Alberta, Canada, 2.5 parts peroxide sold under the trade designation "TRIGONOX 101-50 pd", AkzoNobel Polymer Chemicals LLC, Chicago, Ill., and 3 parts of TAIC, triallylisocyanurate (70%) available under the trade designation "TAIC" from Nippon Kasei, Japan. To each sample 5 parts ZnO (available from Lanxess, Leverkusen, Germany) was added and is designated below with the letter A. In some samples, no ZnO was added and these samples are designated with the letter B.

Press-Cure: 150×100×2.0 mm sheets were prepared for physical property determination by pressing at about 10 MegaPascals (MPa) for 7 minutes at 177° C.

Post-Cure: the press-cured sheets were post-cured by exposure to heat for 16 h at 230° C. in an oven.

Cure rheology: tests were carried out using uncured, compounded samples using a rheometer (e.g. Rubber Process Analyzer (RPA) Model 2000 from Alpha Technologies) in accordance with ASTM D 5289 at 177° C., no pre-heat, 12 minute elapsed time, and a 0.5 degree arc, 100 cycles per minute). Both the minimum torque ($M_L$) and highest torque attained during a specified period of time when no plateau or maximum torque was obtained ($M_H$) were measured. Also measured were the time for the torque to increase 2 units above $M_L$ ($t_s2$), the time for the torque to reach a value equal to $M_L+0.5(M_H-M_L)$, (t'50), and the time for the torque to reach $M_L+0.9(M_H-M_L)$, (t'90). Results are reported in Table 1.

Post-cured sheets (procedure see above) of the curable composition were used for physical property determination. All specimens were returned to ambient temperature before testing.

Physical Properties

Tensile strength at break, elongation at break, and modulus at 100% elongation were determined according to ASTM D 412 using samples cut from the corresponding post-cured sheets using punch Die D according ASTM D 412.

Shore A Hardness was measured using ISO 7619-1 with a Type A-2 Shore Durometer.

O-Ring Molding and Compression Set

O-rings having a cross-section thickness of 0.139 inch (3.5 mm) were molded (12 min cure at 177° C.) from compounded sample followed by a postcure in air for 16 hrs at 230° C. The O-rings were subjected to compression set testing for 70 hours following a similar method as described in ASTM 395-89 method B (analyzed in triplicate), with 25% initial deflection at variable time and temperature as per Table 1.

Foreseeable modifications and alterations of this invention will be apparent to those skilled in the art without departing from the scope and spirit of this invention. This invention should not be restricted to the embodiments that are set forth in this application for illustrative purposes.

What is claimed is:

1. A composition comprising a highly fluorinated elastomer gum wherein the highly fluorinated elastomer gum is derived from (a) a fluorinated di-iodo ether compound of the following formula I:

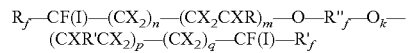

wherein

X is independently selected from F, H, and Cl;

$R_f$ and $R'_f$ are independently selected from F and a monovalent perfluoroalkane having 1-3 carbons;

R is F, or a partially fluorinated or perfluorinated alkane comprising 1-3 carbons;

$R''_f$ is a divalent fluoroalkylene having 1-5 carbons or a divalent fluorinated alkylene ether having 1-8 carbons and at least one ether linkage;

k is 0 or 1; and n, m, and p are independently selected from an integer from 0-5, with the proviso that when k is 0, n+m is at least 1 and p+q is at least 1; and (b) a fluorinated monomer wherein the fluorinated monomer is selected from at least one of vinylidene fluoride, tetrafluoroethylene, hexafluoropropylene, a fluorinated allyl ether, a fluorinated vinyl ether, and combinations thereof.

2. The composition of claim 1, wherein the fluorinated di-iodo ether compound of formula I comprises less than 1% by weight hydrogen.

3. The composition of claim 1, wherein the fluorinated di-iodo ether compound is perfluorinated.

4. The composition of claim 1, wherein the highly fluorinated elastomer gum is derived from 0.1-1 wt % of the fluorinated di-iodo ether compound of formula I.

5. The composition of claim 1, wherein the fluorinated vinyl ether is selected from at least one of a perfluoro

TABLE 1

| | Sample | | | | | | | | | |
|---|---|---|---|---|---|---|---|---|---|---|
| | Comp. Ex. | | Example 1 | | Example 2 | | Example 3 | | Example 4 | |
| | A | B | A | B | A | B | A | B | A | B |
| $M_L$ [in-lb] | 1.19 | 0.90 | 3.33 | 2.00 | 2.72 | 2.46 | 1.84 | 1.86 | 1.47 | 1.39 |
| $M_H$ [in-lb] | 33.60 | 32.52 | 33.11 | 26.91 | 29.91 | 28.34 | 29.26 | 28.79 | 28.21 | 28.84 |
| Tan δ at $M_L$ | 1.159 | 1.234 | 0.660 | 0.825 | 0.755 | 0.755 | 0.856 | 0.848 | 0.990 | 1.035 |
| Tan δ at $M_H$ | 0.057 | 0.046 | 0.066 | 0.052 | 0.065 | 0.055 | 0.067 | 0.06 | 0.067 | 0.06 |
| ts2 [min] | 0.28 | 0.28 | 0.28 | 0.29 | 0.29 | 0.30 | 0.29 | 0.30 | 0.31 | 0.29 |
| t'50 [min] | 0.38 | 0.39 | 0.40 | 0.40 | 0.39 | 0.41 | 0.40 | 0.41 | 0.42 | 0.40 |
| t'90 [min] | 0.56 | 0.64 | 0.61 | 0.61 | 0.62 | 0.67 | 0.60 | 0.64 | 0.66 | 0.66 |
| Physical Properties | | | | | | | | | | |
| Tensile Strength [MPa] | 17.3 | 17.2 | 19.4 | 19.2 | 18.3 | 18.5 | 17.1 | 16.6 | 18.4 | 17.0 |
| Elongation % | 116 | 129 | 139 | 157 | 153 | 160 | 122 | 135 | 148 | 153 |
| Modulus [MPa] | 14.4 | 12.5 | 12.8 | 10.3 | 10.7 | 10.3 | 13.2 | 11.3 | 11.4 | 10.3 |
| Shore A Hardness | 77 | 78 | 77 | 75 | 77 | 76 | 78 | 77 | 77 | 78 |
| Comp. set at 232° C. | 32 | 39 | 35 | 44 | 27 | 35 | 33 | 40 | 42 | 46 |
| Comp. set at 200° C. | 12 | 12 | 17 | 15 | 14 | 15 | 16 | 15 | 18 | 14 |

(methyl vinyl) ether (PMVE), perfluoro (ethyl vinyl) ether (PEVE), perfluoro (n-propyl vinyl) ether (PPVE-1), perfluoro-2-propoxypropylvinyl ether (PPVE-2), perfluoro-3-methoxy-n-propylvinyl ether, perfluoro-2-methoxy-ethylvinyl ether, and $CF_3—(CF_2)_2—O—CF(CF_3)—CF_2—O—CF(CF_3)—CF_2—O—CF=CF_2$, and combinations thereof.

6. The composition of claim 1, wherein the fluorinated allyl ether is selected from at least one of a perfluoro (methyl allyl) ether, perfluoro (ethyl allyl) ether, perfluoro (n-propyl allyl) ether, perfluoro-2-propoxypropylallyl ether, perfluoro-3-methoxy-n-propylallyl ether, perfluoro-2-methoxy-ethylallyl ether, and $CF_3—(CF_2)_2—O—CF(CF_3)—CF_2—O—CF(CF_3)—CF_2—O—CF_2CF=CF_2$ and combinations thereof.

7. The composition of claim 1, further comprising a non-fluorinated monomer.

8. The composition of claim 7, wherein the non-fluorinated monomer is ethylene, propylene, or combinations thereof.

9. The composition of claim 1, further comprising a cure site monomer, wherein the cure site monomer comprises at least one of (a) a Br, (b) a I, (c) a nitrile endgroup, and (d) two carbon-carbon double bonds.

10. A cured fluoroelastomer composition comprising the reaction product of a curing reaction of the composition according to claim 1 and a peroxide cure system.

11. A shaped article comprising the cured highly fluorinated elastomer according claim 10.

12. The shaped article of claim 11, selected from at least one of a hose, a tube, and an O-ring.

13. The composition of claim 1, wherein the highly fluorinated elastomer gum is derived from at most 5% by weight of the fluorinated di-iodo ether compound relative to the total weight of monomers.

14. The composition of claim 1, wherein the highly fluorinated elastomer gum is derived from at most 3% by weight of the fluorinated di-iodo ether compound relative to the total weight of monomers.

15. The composition of claim 1, wherein the highly fluorinated elastomer gum is derived from at most 1% by weight of the fluorinated di-iodo ether compound relative to the total weight of monomers.

16. The composition of claim 1, wherein the highly fluorinated elastomer gum is derived from a free radical polymerization.

* * * * *